(12) United States Patent
Foster et al.

(10) Patent No.: US 7,673,053 B1
(45) Date of Patent: Mar. 2, 2010

(54) SYSTEM AND METHOD FOR PROVIDING A COMMUNICATIONS SERVICE IN DISTRIBUTED COMPUTING ENVIRONMENT

(75) Inventors: David B. Foster, Pinson, AL (US); Larry K. Holden, Birmingham, AL (US)

(73) Assignee: AT&T Intellectual Property I, L.P., Reno, NV (US)

( * ) Notice: Subject to any disclaimer, the term of this patent is extended or adjusted under 35 U.S.C. 154(b) by 2169 days.

(21) Appl. No.: 10/231,258

(22) Filed: Aug. 30, 2002

(51) Int. Cl.
*G06F 15/16* (2006.01)

(52) U.S. Cl. ..................................... 709/227

(58) Field of Classification Search ................ 709/203, 709/226; 719/315–316
See application file for complete search history.

(56) References Cited

U.S. PATENT DOCUMENTS

| | | | |
|---|---|---|---|
| 6,052,718 A | 4/2000 | Gifford | |
| 6,130,875 A | 10/2000 | Doshi et al. | |
| 6,216,173 B1 | 4/2001 | Jones et al. | |
| 6,505,254 B1 | 1/2003 | Johnson et al. | |
| 6,718,550 B1 * | 4/2004 | Lim et al. | 710/310 |
| 6,970,902 B1 | 11/2005 | Moon | |
| 6,976,261 B2 * | 12/2005 | Callsen et al. | 719/316 |
| 7,055,028 B2 * | 5/2006 | Peiffer et al. | 713/151 |
| 7,275,079 B2 * | 9/2007 | Brodsky et al. | 709/203 |
| 7,290,056 B1 * | 10/2007 | McLaughlin, Jr. | 709/230 |
| 7,523,164 B2 * | 4/2009 | Kantor et al. | 709/206 |
| 2002/0178299 A1 * | 11/2002 | Teubner | 709/320 |
| 2003/0120817 A1 | 6/2003 | Ott et al. | |
| 2005/0144267 A1 * | 6/2005 | Maron | 709/223 |

OTHER PUBLICATIONS

T. Koch and S. Murer, "Service Architecture Integrates Mainframes in a CORBA Environment," Sep. 27-30, 1999.
"The Common Object Request Broker: Architecture and Specification." Revision 2.0, Jul. 1995, Updated Jul. 1996; chapter 1-3, 7, Appendix D.
Morgan, Bryan. "CORBA meets Java." JavaWorld, <http://www.javaworld.com/javaworld/jw-10-1997/jw-10-corbajave_p.html>, Oct. 1997, retrieved Apr. 14, 2006.
Garg, Rohit. "Enterprise JavaBeans to CORBA Mapping." Version 1.0, Sun Microsystems; Mar. 23, 1998.

(Continued)

*Primary Examiner*—Salad Abdullahi
(74) *Attorney, Agent, or Firm*—Parks IP Law LLC; Jennifer Pearson Medlin, Esq

(57) ABSTRACT

A broker of the present invention enables distributed applications to communicate with a server in distributed computing environment. The broker receives from a client a request to execute a transaction. The broker receives input parameters including input data. The broker uses a routing service to locate the server. The broker then establishes a communications connection to the server and forwards the input data. The transaction is executed and the broker receives a response from the server. The broker forwards the response to the client. The broker can segment the input data before forwarding the input data to the server. If the response is in multiple segments, the broker can combine the multiple segments into one string before forwarding the response to the client. Further, the broker may receive requests from multiple clients via multiple communications connections. The broker then consolidates the multiple communications connections and establishes one communications connection to the server.

25 Claims, 6 Drawing Sheets

OTHER PUBLICATIONS

Krumel, Andy. "Locating CORBA objects using Java IDL." JavaWorld, <http://www.javaworld.com/javaworld/jw-02-1999/jw-02-enteprise_p.html>, Feb. 1999; retrieved Apr. 14, 2006.

Brown, Kyle, Lee Cook. "What's it going to take to get you to go with EJB components?" IBM, <http://www.128.ibm.com/developerworks/ibm/library/ibm-ejb/>, May 4, 2000; retrieved Apr. 18, 2006.

Goetz, Brian. "J2EEE or J2SE? JNDI works with both." JavaWorld, <http://www.javaworld.com/javaworld/jw-04-2002/jw-0419-jndi_p.html>, Apr. 2002; retrieved Apr. 14, 2006.

* cited by examiner

Known Art

SYSTEM AND METHOD FOR PROVIDING A COMMUNICATIONS SERVICE IN DISTRIBUTED COMPUTING ENVIRONMENT

BACKGROUND

1. Field of the Invention

The present invention relates generally to a communications infrastructure and, more particularly, to a system and method for providing a service that enables and manages communications between distributed applications and legacy systems in distributed computing environment.

2. Background of the Invention

The mainframe-based information technology (IT) environment is still a common architecture in many large organizations. One of the most popular operating systems for mainframes is IBM's OS/390. OS/390 consists of several subsystems, including IMS (Information Management System) and CICS (Customer Information Control System).

Mainframe based applications can be integrated into distributed computing environment using a CORBA-based system. CORBA is OMG's (Object Management Group's) open, vendor-independent specification for an architecture and infrastructure that computer applications use to work together over networks. CORBA is designed to provide interoperability between applications that may be written in different languages and may run on different platforms. CORBA defines an implementation independent object model, which is built with a programming language, such as C++ or Java. CORBA provides object services that are domain-independent interfaces that are used by many distributed object programs.

CORBA defines an ORB (Object Request Broker) that handles the transport of information between applications. The ORB functions as a communications infrastructure, transparently relaying object requests across distributed heterogeneous computing environments. ORB simplifies distributed programming by decoupling the client from the details of the method invocations. Interoperability is accomplished through well-defined object interface specifications, which allow client applications to connect to the ORB, specified in OMG IDL (Interface Definition Language). OMG IDL defines the types of objects according to the operations that may be performed on them and the parameters to those operations.

FIG. 1 shows the basic CORBA ORB architecture. Client 100 is the entity that wishes to perform an operation on an object. The object, which is known as a "servant" and implemented by a server, is an entity that consists of an identity, an interface and an implementation. Object implementation 102 is a code and data that actually implements the object. Object implementation 102 provides the semantics of the object, usually by defining data for the object instance and code for the object's method. The objects export object references with interfaces specified by the OMG IDL for use by clients. The object reference contains an identification of the object implementation so that the object adapter can pass the client's request to the correct object in the server. The CORBA architecture is implemented in a conventional programming language, such as C, C++, Java, or Smalltalk.

To use CORBA, OMG IDL specification is written and compiled to generate client stubs and server skeletons in the languages in which client and server are written. The stubs and skeletons serve as proxies for clients and servers, respectively. The stubs and skeletons are then included in the client's program and the server's program, respectively. Thereafter, client 100 initiates a request to an operation on object implementation 102 through IDL stub 106. The request is an event carrying information that includes an operation, an object reference of the service provider, and actual parameter. IDL stub 106 represents the mapping between the language of implementation of client 100 and ORB 104. IDL skeleton 110 represents the mapping between the language of implementation of object implementation 102 and ORB 104. ORB 104 locates the appropriate implementation code, transmits parameters and transfers control to object implementation 102 through IDL skeleton 110. In performing the request, the object implementation may obtain some services from ORB 104 through object adapter 112. When the request is complete, control and output values are returned to client 100.

Orbix, which is a CORBA compliant ORB from IONA Technologies, Inc., has become a popular CORBA based system. Orbix uses a connection-oriented network design where each client process establishes a socket connection to each server process. Socket is a TCP/IP (Transmission Control Protocol/Internet Protocol) application programming interface that allows connection between two TCP/IP programs. For example, each of one hundred clients on system X communicating with one hundred servers on system Y would use 10,000 (100×100) sockets. The number of sockets of a system is limited. For any OS/390 process, for example, there is a practical limit of 2,000 simultaneous socket connections.

FIG. 2 is a block diagram showing a mainframe-based system integrated into distributed computing environment. As an example, system 200 is a legacy system running on OS/390 and integrated into distributed computing environment using Orbix. Subsystem 208 of system 200, as an example, is an IMS. An OS/390 mainframe can include multiple IMS control regions. An IMS adapter, such as Orbix IMS adapter, is loaded on each of the control regions. The IMS adapter allows the client to remotely call and communicate with IMS applications. As shown in FIG. 2, IMS adapter 206 is loaded on control region 222. Access to transaction 220 is realized via IMS adapter 206. IMS adapter 206 includes interfaces for communications. IMSraw interface 210 is one of such interfaces. IMSraw interface 210 is a generic interface offering an operation "run transaction" for invoking legacy transactions.

To execute transaction 220 in IMS 208, client 202 obtains an object reference of IMS adapter 206 from name service 204. Client 202 can use name service 204 to obtain the object reference. Client 202 then sends a request to execute transaction 220 to IMS adapter 206 through IMSraw interface 210. Client 202 establishes a socket connection to IMS adapter 206. IMS adapter 206 receives the request and forwards the request to control region 222. The request is processed (i.e., the transaction is executed). IMS adapter 206 sends a response to client 202. Clients 230, 232 and 234 perform the same process described above to execute transaction 220. Each client establishes a socket connection to IMS adapter 206.

SUMMARY OF THE INVENTION

The present invention provides methods, systems, and computer program products for enabling distributed applications to communicate with legacy systems in distributed computing environment. The present invention provides a broker that manages communications between client applications and transaction adapters.

A preferred embodiment of the present invention is a broker that provides socket connection consolidation. The socket connection consolidation provided by the broker enables a service provider application to support a larger number of client applications. The broker provides routing to the appropriate service provider application by message content and context. The broker abstracts message segmentation complexities and application specific details from distributed client applications. The broker of the present invention can be provided as a CORBA service, an MQSeries-based service, or any kinds of middleware. The broker can be provided as distributed service miming separately from the client applications or co-located to the client applications. The broker also functions as an authority delegation between the client applications and the service provider applications.

In one embodiment, the broker of the present invention receives a request to execute a transaction from a client with input parameters. The input parameters may include a policy, a sequence of properties and a string of input data. The broker uses the policy and the sequence of properties to initiate a routing request. A routing service receives the routing request and returns a transaction name and the name of the transaction adapter that can execute the transaction. Using the name of the transaction adapter as the key, the broker then obtains an object reference of the transaction adapter. The name service can be used to obtained the object reference. Using the object reference, the broker submits the transaction to an interface of the transaction adapter with the input data as parameter. The transaction is executed and the broker receives a response from the transaction adapter. The broker forwards the response to the client. The broker can segment the input data before submitting to the transaction adapter if needed. If the response is in multiple segments, the broker can combine the multiple segments into one string before forwarding the response to the client. Further, the broker may receive a security identifier from the client and forward to the transaction adapter for security authentication and/or authorization.

In another embodiment, The broker of the present invention receives multiple communications connections from multiple clients. The broker consolidates the multiple communications connections and establishes one communications connection to the server.

In another embodiment, the broker of the present invention enables distributed applications to communicate with existing IMS servers. A client initiates a request to the broker to execute an IMS transaction. The broker contacts the routing service. The routing service locates the IMS transaction and an IMS control region. The routing service returns a transaction name and the name of the Orbix IMS adapter that can execute the transaction. Using the Orbix IMS adapter name as the key, the broker obtains an object reference of Orbix IMS adapter. Using the object reference, the broker submits the transaction to an IMSraw interface. The response returned from the IMS control region is returned to the client.

DETAILED DESCRIPTION OF THE INVENTION

The present invention provides a broker that enables distributed applications to communicate with legacy systems in distributed computing environment. The present invention provides a broker that manages communications between distributed applications and service provider applications. The broker of the present invention reduces a number of socket connections between distributed applications and transaction adapters. The broker enables the service provider applications to be able to provide services in a large scale distributed environment without degradation of performances. The broker of the present invention can be provided as a CORBA service, an MQSeries-based service, or other type of middleware services.

The broker of the present invention receives a request to execute a transaction from a client. The broker locates the transaction and an appropriate transaction adapter. The broker submits the request via the transaction adapter. Once the transaction is executed, the broker receives a response from the transaction adapter and forwards the response to the client. The broker may receive requests from multiple clients via multiple communications connections. The broker consolidates the multiple connections and provides one communications connection to the transaction adapter. The broker hides and encapsulates all of its functions within one service.

Reference will now be made in detail to the preferred embodiments of the present invention, examples of which are illustrated in the accompanying drawings.

The broker of the present invention can be used with any type of transaction adapters. For clarity, however, the below description uses an IMS adapter as an example.

Figure 1:
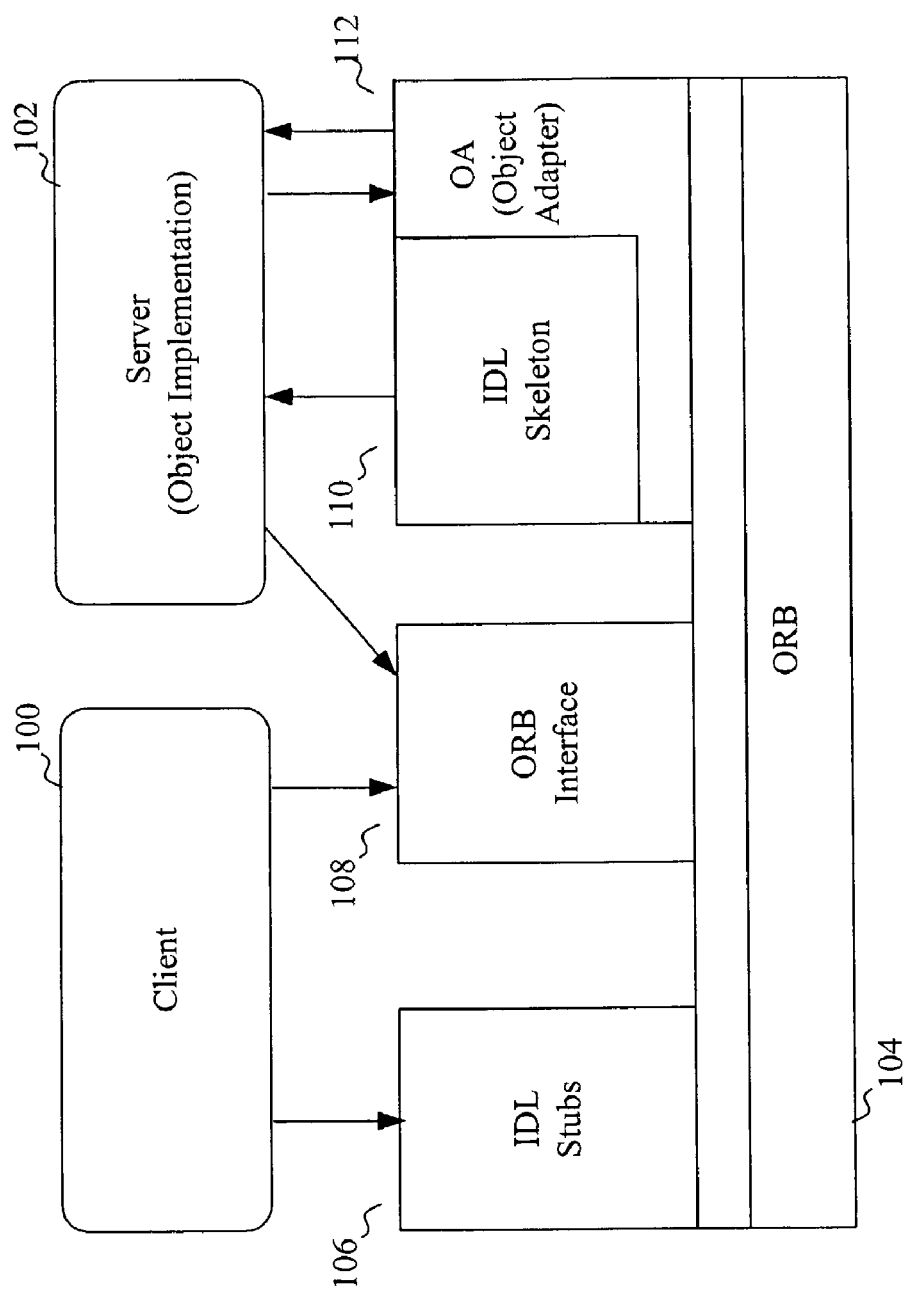
FIG. 1 is a schematic diagram showing a known CORBA ORB architecture.
Figure 2:
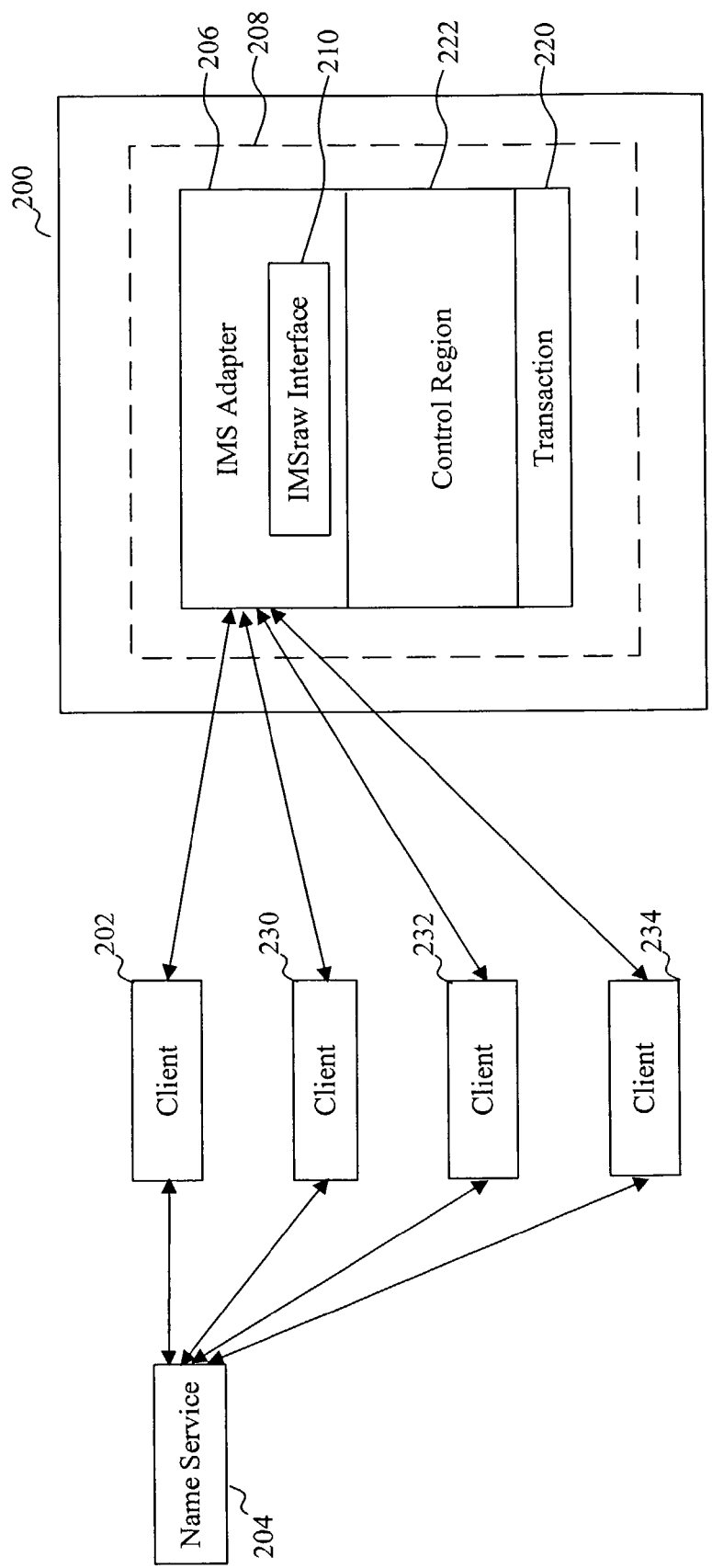
FIG. 2 is a schematic diagram showing a mainframe-based system integrated into distributed computing environment.
Figure 3:
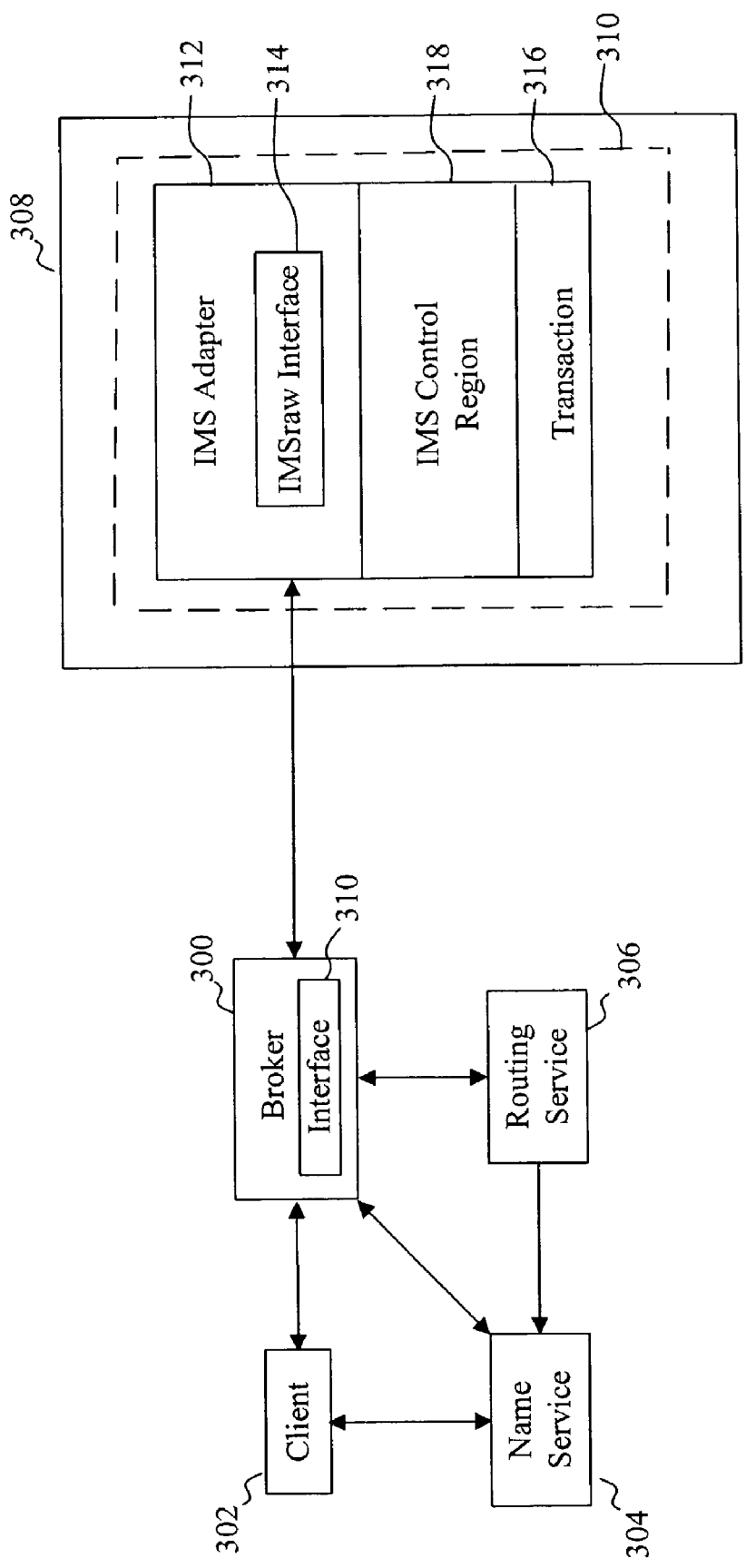
FIG. 3 is a schematic diagram showing the relationship of a broker of the invention with other elements in distributed computing environment according to a preferred embodiment of the present invention.

FIG. 3 is a schematic diagram that illustrates, in a very simple fashion, distributed computing environment including the communications framework of the present invention. System 308 may be a legacy system in any platform and/or language. In this embodiment, as an example, system 308 is a mainframe running on IBM's OS/390 and sub-system 310 is an IMS. IMS 310 includes IMS control region 318 and transaction 316. IMS adapter 312 is loaded on IMS control region 318. Transaction 316 is integrated into distributed computing environment via IMS adapter 312. IMS adapter 312 provides interfaces for communication, such as IMSraw interface 314.

Client 302 initiates a request to execute transaction 316. Broker 300 receives the request. Broker 300 then locates IMS adapter 312 and transaction 316 using routing service 306. Name service 304 provides an object reference of routing service 306. Routing service 306 is disclosed in U.S. patent application Ser. No. 10/223,359 filed on Aug. 20, 2002, which is assigned to the assignee of the present application and is incorporated herein by reference in its entirety. Once IMS adapter 312 and transaction 316 are located, broker 300 submits the request to IMS adapter 312 to execute transaction 316.

Broker 300 includes interfaces. Interface 310 of broker 300 can be defined in an IDL as follows:

module ims {
interface broker {
typedef sequence<char> CharSegment;
exception InvalidValueException {string reason;};

```
exception RequiredPropertyNotFoundException {string
    reason;};
exception UnrecognizedPropertyException {string rea-
    son;};
exception PolicyNotFoundException {string reason;};
exception RouterUnavailableException {string reason;};
exception RouterException {string reason;};
exception UserNotAuthorizedException {string reason;};
exception IMSUnavailableException {string reason;};
exception TransactionFailedException {string reason;};
exception IMSAdapterUnavailableException {string rea-
    son;};
exception IMSAdapterException {string reason;};
exception BrokerInternalException {string reason;};
exception BrokerExternalException {string reason;};
struct Property {
    string name;
    string value;
};
typedef sequence<Property> PropertySeq;
void execute(in string policy,
    in PropertySeq desiredProperties,
    in long requestSize,
    in CharSegment request,
    in boolean navHeader, //set true if you want to send
        header
    out long responseSize,
    out CharSegment response)
raises (RequiredPropertyNotFoundException,
    InvalidValueException,
    UnrecognizedPropertyException,
    PolicyNotFoundException,
    IMSAdapterUnavailableException,
    UserNotAuthorizedException,
    TransactionFailedException,
    IMSUnavailableException,
    IMSAdapterException,
    RouterUnavailableException,
    RouterException,
    BrokerExternalException,
    BrokerInternalException);
};
};
```

As shown above, input parameters of the execute method includes, for example, "policy," "desiredProperties" and input data.

The attributes of the execute method "policy" and "desiredProperties" are forwarded to the routing service and used to locate an appropriate transaction. The first attribute "policy" can be equivalent to a contract name in the local database of the routing service.

The second input attribute "desiredProperties" may be a sequence of property name/value pairs. Some possible types of desiredProperties can include the following:

version: indicates a version of a transaction or object to be resolved by the routing service;

mode: provides a direction to the routing service;

userid: indicates an unique identifier associated with a user;

otherid: indicates an unique identifier associated with a user, which can be used for second level authentication by an IMS (This may be an option);

maxresplen: indicates desired maximum length of a response (This may be an option);

loglevel: indicates desired loglevel of the broker for a particular transaction (This may be an option);

key: indicates a content-based routing key to be used in mapping to a target service (For example, address, site code, state code, or any other content-based routing criteria defined by a client can be used. The routing service may parse the key provided by the client based on a rule specified on the policy to build the true concatenated key to be matched against the routing rules. The key can be extracted from the data and can be used by the routing service to find the routing information. For data 123456789, for example, key can be 123456. The key may be an option); and timeout: indicates maximum amount of time that the broker would wait for a response from an IMS adapter (Timeout may be indicated in milliseconds. This may be an option).

Exceptions, such as, RequiredPropertyNotFoundException, InvalidValueException and UnrecognizedPropertyException, indicate errors in using the broker. For example, UnrecognizedPropertyException indicates that a property is not recognized by the broker.

Figure 4:
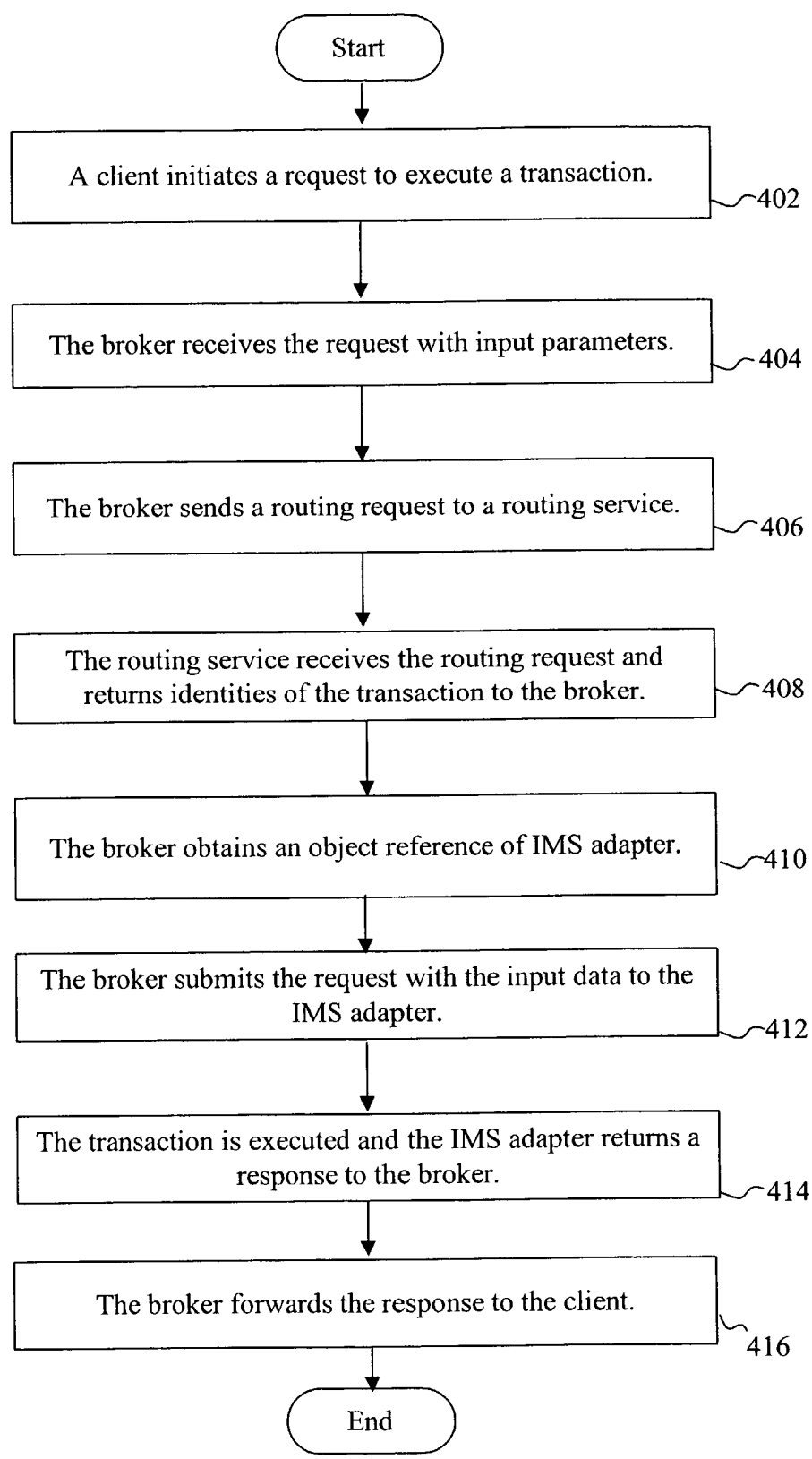
FIG. 4 is a flow diagram showing exemplary steps of the operation of the broker in distributed computing environment according to a preferred embodiment of the present invention.

FIG. 4 shows a flow diagram illustrating the operation of broker 300 and interaction of various systems shown in FIG. 3.

In step 402, client 302 initiates a request to execute transaction 316. Client 302 invokes the execute method of broker 300 defined in the IDL shown above. Client 302 provides the input parameters. The input parameters include a policy, input data and desiredProperties.

In step 404, broker 300 receives the request with the input parameters from the client.

In step 406, broker 300 sends a routing request to routing service 306 to locate IMS adapter 312 and transaction 316. Broker 300 forwards information needed for routing service 306 to locate the IMS adapter and the transaction to the routing service. Broker 300 forwards the policy and the desiredProperties from the input parameters to routing service 306.

In step 408, routing service 306 receives the routing request and returns identifiers of IMS adapter 312 and transaction 316 to broker 300. The identifiers include, for example, a name of IMS adapter 312 and a name of transaction 316. The operation of routing service 306 is disclosed in U.S. patent application Ser. No. 10/223,359 filed on Aug. 20, 2002.

In step 410, using the identifiers received from routing service 306, broker 300 obtains an object reference of IMS adapter 312. Broker 300 can use name service 304 to obtain the object reference.

In step 412, broker 300 connects to IMS adapter 312 and forwards the input data received from the client to execute transaction 316. An interface 314, such as an IMSraw interface, can be used for the communication.

In step 414, the transaction is executed and IMS adapter 312 returns a response. The response may include a character sequence. The response may also include a length of the response.

In step 416, broker 300 receives the response and forwards the response to client 302.

Figure 5:
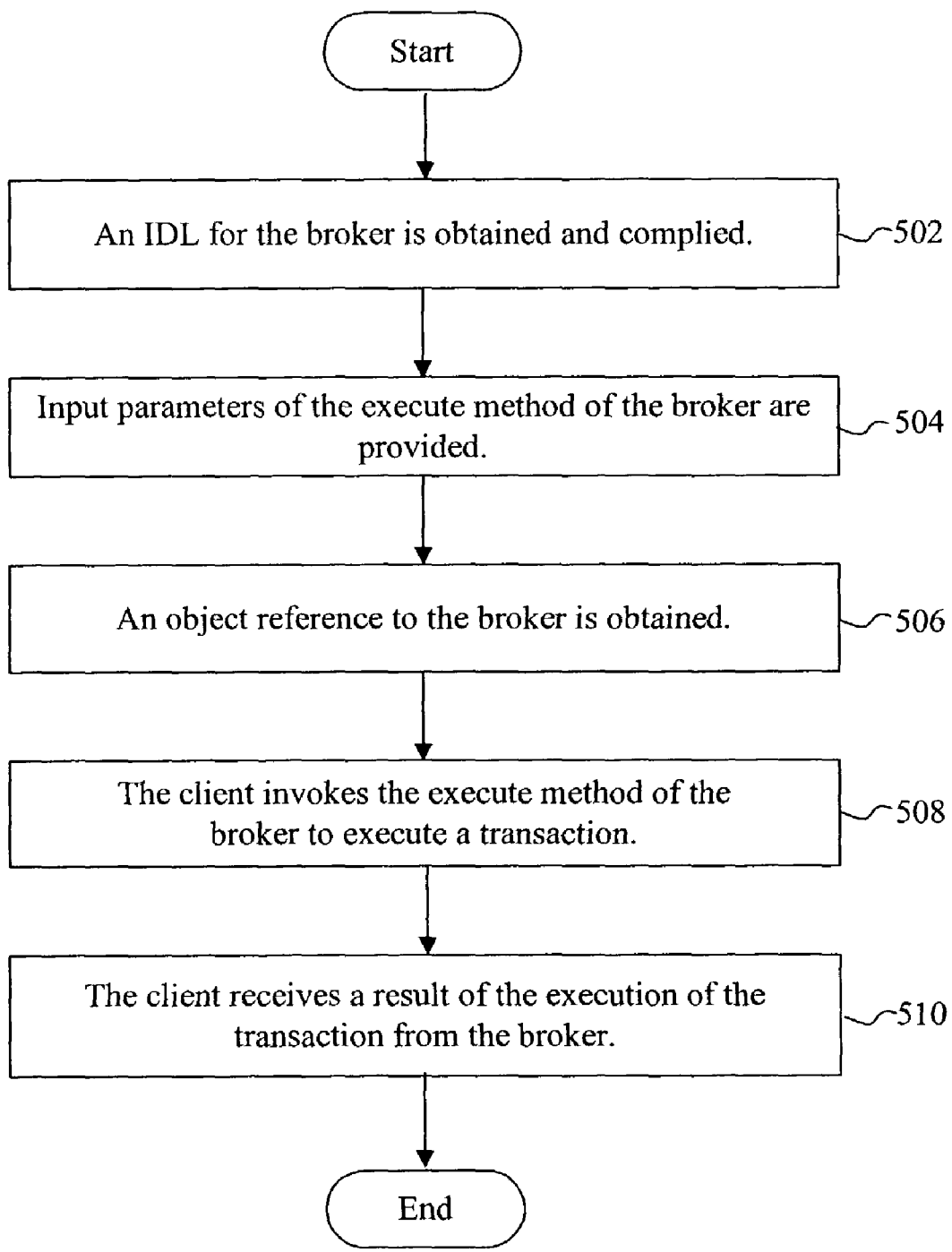
FIG. 5 is a flow diagram showing exemplary steps that a client can use to operate the broker of the invention in a distributed computing environment according to a preferred embodiment of the present invention.

FIG. 5 shows a flow diagram illustrating exemplary steps that a client can use to execute transaction 316 using broker 300 shown in FIG. 3.

In step 502, an IDL for broker 300 is obtained. The IDL is then compiled on client 302 to obtain a stub. The stub is integrated with a client code. The client will use the stub to communicate with broker 300.

In step 504, the input parameters of the execute method of broker 300 are provided in the client code. This can be achieved by providing a desired value for input attributes of the execute method. The input attributes of the execute method are described in detail above. A value for "policy" is provided. For "desiredProperties", for example, mode can be set as "mode=T" and timeout can be set as "timeout=40000." Other desiredProperties, such as key and loglevel can also be provided. Further, the input data string that is appropriate to execute the transaction is provided. The length of a request string may be provided.

Following is an example of the client code that can be used.

```
ims::Broker_ptr IT_obj;
CORBA::String_var      policy;
ims::Broker::PropertySeq  desiredProperties;
CORBA::String_var      request;
CORBA::String_var      response;
policy="NAVTEST3";
desiredProperties.length(3); // number of properties
desiredProperties[0].name="VERSION";
desiredProperties[0].value="0001";
desiredProperties[1].name="MODE";
desiredProperties[1].value="T";
desiredProperties[2].name="KEY";
desiredProperties[2].value="A04";
indata="A04 BLAHBLAHBLAH";
try {
   IT_obj->execute(
      policy,
      desiredProperties,
      request, 0,
      response);
}
catch (const ims::Broker::NotFoundException &ex) {
      cout << "call_ims_Broker_execute( ): call failed properly due to..."
         << endl
         << " ims:Broker::NotFoundException exception = "
         << ex.reason << endl;
      return;
}
catch (const CORBA::SystemException &ex) {
      cout << "call_ims_Broker_execute( ): call failed." << endl
         << ex << endl;
      return;
}
cout << "call_MBDB_Broker_execute( ): "
   << "success: got back..."
   << endl;
cout << " response = " << response << endl;
}
```

In step 506, an object reference of broker 300 is obtained. Remote CORBA services (either remote routing service or other remote CORBA services) or the client's local CORBA name service can be used to obtain the object reference. Preferably, the client's local CORBA name service is used. Lookup method can be used to obtain the object reference.

In step 508, the client invokes the execute method of broker 300. Broker 300 then locates transaction 316 and IMS adapter 318 using routing service 308. The broker accesses the transaction via the IMS adapter. The transaction is executed. The IMS adapter returns a response to broker 300.

In step 510, the client receives the response from the broker. The response may include character sequence. The response may also include a length of the response.

Broker 300 of the present invention facilitates execution of a transaction by building and sending a request to the legacy systems. Some of IMS transactions are horizontally distributed based on the data contained in the request (i.e., content routing). For example, a telephone service provider may have multiple mainframe regions. Each mainframe region has databases that contain information regarding a portion of the customers of the telephone service provider. Alabama customer accounts, for example, are located in a control region different from that of the South Florida accounts. The transactions also usually have different regions based on, for example, whether the request is for development, testing, or production (i.e., context routing). Using the routing service, the broker can locate the right transaction and right control region from the input parameters.

Broker 300 can segment the input data string provided by the client before sending the input data string to the IMS adapter. For example, the IMS adapter sends and receives data in 8K blocks. If the input data string received from the client is larger than 8K, the broker can segment the input data string into one or more of 8K segments before sending the input data string to the IMS adapter. The IMS Adapter may convert the segmented input data string from ASCII (American Standard Code for Information Interchange) character set to EBCDIC (Extended Binary Coded Decimal Interchange Code) character set. Broker 300 can also receive a response in multiple segments and combine the multiple segments into one string before forwarding to the client.

Broker 300 provides authenticate delegation. The client provides a security identity, such as "userid," to the IMS adapter through the broker. To use the transaction in a particular control region, the userid of the request needs to have authority in IMSSS (IMS Security System). Transactions must be authenticated with the IMSSS before they are scheduled. The IMS adapter uses the security identity forwarded by the broker to check IMS security, when starting the transaction. The property "otherid" can be used for security authentication, in addition to the "userid."

The broker provides connect-pooling. The broker consolidates multiple socket connections between clients and transaction adapters. The broker enables multiple clients to be able to connect to an transaction adapter using one socket connection. The broker concentrates the sockets for multiple clients within single application server and also for multiple servers.

Figure 6:
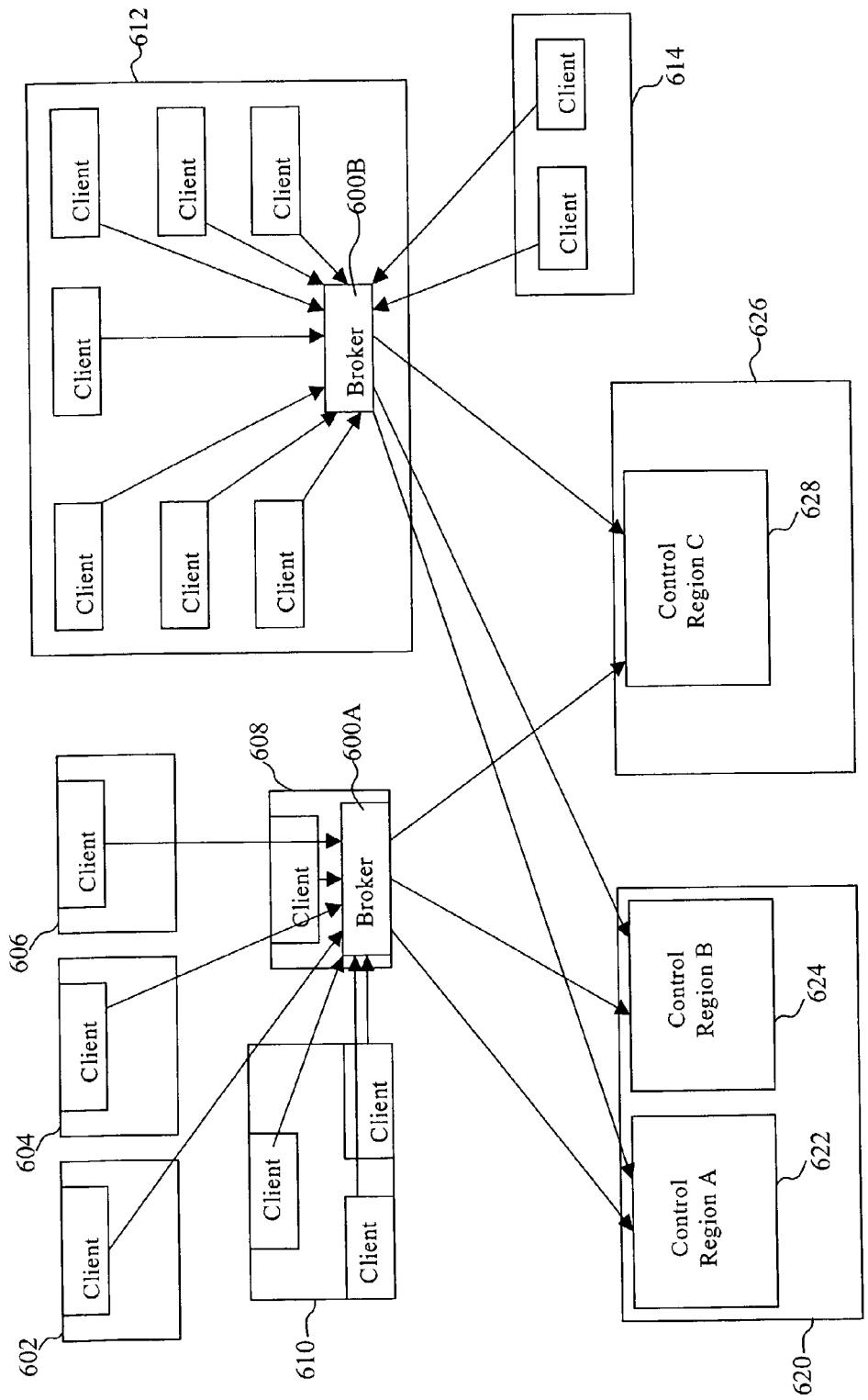
FIG. 6 is a schematic diagram showing a distributed computing environment according to another embodiment of the present invention.

FIG. 6 is a schematic diagram that illustrates, in a simple fashion, the connection-pooling provided by the broker of the present invention. Transactions are horizontally distributed and the broker is running in multiple instances. First system 620 includes control region A 622 and control region B 624. Second system 626 includes control region C 628. First broker 600A and second broker 600B are examples of multiple instances of broker 300. Each instance of the broker receives requests from multiple clients. The each instance of the broker can receive requests from multiple application servers. The each instance of the broker can also receive multiple requests from one application server. The each instance of the broker can be local or remote to a client. For example, first broker 600A receives requests from multiple application servers 602, 604, 606, and 608. First broker 600A also receives multiple requests from server 610. Second broker 600B receives multiple requests from each of server 612 and server 614. Second broker 601B is local to server 612 but remote to server 614. The each instance of the broker consolidates the multiple connections from the clients and establishes one socket connection to each of the control regions. First broker 600A establishes one socket connection with each of the control regions 622, 624 and 626. Second broker 600B also establishes one socket connection with each of the control regions 622, 624 and 626. By consolidating multiple connections from the clients and establishing one socket connection to a server, the broker of the present invention can effectively increase the number of clients that a mainframe-based system can support simultaneously. With the broker of the present invention, a server with the limited number of socket connections can provide a service to the larger number of clients.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method for executing an IMS (Information Management System) transaction in a distributed computing environment supporting multiple communications protocols, comprising the steps of:
   receiving a request and input parameters from a client;
   locating the IMS transaction and an IMS adapter associated with the IMS transaction;
   establishing a communications connection to the IMS adapter;
   receiving a response from the IMS adapter;
   when the response includes multiple segments, combining the multiple segments into one string; and
   forwarding the response to the client, wherein the method further includes the steps of receiving requests from a plurality of clients through a plurality of communications connections, and consolidating the plurality of communications connections into a consolidated communications connection to the IMS adapter.

2. The method of claim 1, wherein the communications connection is established to an IMSraw interface of the IMS adapter.

3. The method of claim 1, wherein the method further includes the step of obtaining an object reference of the IMS adapter.

4. The method of claim 1, wherein the input parameters include a policy, a sequence of properties, and input data.

5. The method of claim 4, wherein the step of locating the IMS transaction and the IMS adapter associated with the IMS transaction further includes the steps of:
   forwarding the policy and the sequence of properties to a mechanism that enables distributed applications to locate horizontally distributed service provider applications; and
   receiving a name of the IMS adapter and a name of the IMS transaction.

6. The method of claim 1, wherein the method further includes the step of segmenting the input data before forwarding the input data to the IMS adapter.

7. The method of claim 1, wherein the response includes a character sequence and a length of the response.

8. The method of claim 1, wherein the method further includes the step of passing a security identity from the client to the IMS adapter for security authentication.

9. A method for providing a broker service that enables a plurality of clients to communicate with a transaction adapter corresponding to each of a plurality of control regions of a system in a distributed computing environment that supports multiple communications protocols, comprising the steps of:
   receiving one communications connection from each of the plurality of clients;
   receiving input data from the plurality of clients;
   consolidating the received communications connections from the plurality of clients into a consolidated communications connection for each corresponding control region of the system;
   segmenting a string of the input data when the string exceeds a predetermined size;
   establishing a connection between each respective consolidated communications connection and the corresponding transaction adapter; and
   forwarding the input data to each corresponding transaction adapter.

10. The method of claim 9, wherein the method further includes the step of locating the transaction adapter.

11. The method of claim 9, wherein the method further comprises the steps of:
    receiving output from the transaction adapter; and
    forwarding the output to the plurality of clients.

12. The method of claim 11, wherein the method further includes the step of combining multiple segments of the output into one string before forwarding the output to the client.

13. The method of claim 9, wherein the method further includes the step of passing a security identity from the client to the transaction adapter for security authentication.

14. The method of claim 9, wherein the broker service is provided as a CORBA service.

15. A method for providing a broker service that enables a plurality of clients to communicate with a server corresponding to each of a plurality of control regions of a system in a distributed computing environment, comprising the steps of:
    receiving a plurality of communications connections from the plurality of clients;
    receiving input data from the plurality of clients;
    locating each server;
    consolidating the plurality of communications connections into a consolidated communications connection for each corresponding control region of the system;
    obtaining an object reference of the server;
    establishing a connection between each respective consolidated communications connection and each server, wherein the one communications connection represents the plurality of communications from the plurality of clients;
    forwarding the input data from the plurality of clients to the server;
    receiving output from each server;
    when the output includes multiple segments, combining the multiple segments into one string of output; and
    forwarding the output to the plurality of clients.

16. The method of claim 15, wherein the plurality of clients are from a plurality of application servers.

17. The method of claim 15, wherein the plurality of clients are from one application server.

18. The method of claim 15, wherein the server is a transaction adapter.

19. The method of claim 15, wherein the server is an IMS adapter.

20. The method of claim 15, wherein the method further includes the step of forwarding a security identity received from the client to the server.

21. The method of claim 15, wherein the step of locating the server includes using a mechanism, wherein the mechanism enables distributed applications to locate distributed service provider applications, and wherein the mechanism includes a local database for providing an identifier of the service provider application and a routing table for providing properties of the service provider application.

22. A system for providing a communications service between a plurality of clients and a server in a distributed computing environment supporting multiple communications protocols, comprising:
   a plurality of broker mechanisms, each adapted to:
      receive a plurality of communications connections from the plurality of clients;
      consolidate the received communications connections into a consolidated communications connection to the server;
      establish a connection between the consolidated communications connection and the server;
      receive input data from the plurality of clients;
      segment a string of the input data when a string exceeds a predetermined size; and
      forward the input data to the server.

23. The system claim 22, wherein the system further includes a routing mechanism for locating the server in communication with the broker mechanism, wherein the routing mechanism includes a local database for providing identifier of the server and a routing table for providing properties of the service.

24. The method of claim 22, wherein the system receives security identifiers from the plurality of clients and forwards the security identifiers to the server for security authentication.

25. The system of claim 22, wherein the server is a transaction adapter.

\* \* \* \* \*